US012268637B2

(12) United States Patent
Herbst et al.

(10) Patent No.: US 12,268,637 B2
(45) Date of Patent: Apr. 8, 2025

(54) MODULAR STRETCHER FOR PATIENT TRANSPORT APPARATUS

(71) Applicant: Stryker Corporation, Kalamazoo, MI (US)

(72) Inventors: Cory P. Herbst, Shelbyville, MI (US); Kevin M. Patmore, Plainwell, MI (US); Trey Thomas Pfeiffer, Portage, MI (US); Kelly Sandmeyer, Mattawan, MI (US)

(73) Assignee: Stryker Corporation, Portage, MI (US)

( * ) Notice: Subject to any disclaimer, the term of this patent is extended or adjusted under 35 U.S.C. 154(b) by 194 days.

(21) Appl. No.: 18/119,317

(22) Filed: Mar. 9, 2023

(65) Prior Publication Data

US 2023/0285209 A1 Sep. 14, 2023

Related U.S. Application Data

(60) Provisional application No. 63/318,086, filed on Mar. 9, 2022.

(51) Int. Cl.

*A61G 1/013* (2006.01)
*A61G 1/00* (2006.01)
*A61G 1/02* (2006.01)

(52) U.S. Cl.

CPC ............... *A61G 1/013* (2013.01); *A61G 1/02* (2013.01); *A61G 1/00* (2013.01)

(58) Field of Classification Search

CPC .......... A61G 1/013; A61G 1/02; A61G 1/017; A61G 1/00; A61G 7/05; A61G 7/0507; A61G 7/0518

(Continued)

(56) References Cited

U.S. PATENT DOCUMENTS 3,125,766 A * 3/1964 Halperin ................ A61G 1/003 5/627
3,653,079 A * 4/1972 Bourgraf ................ A61G 1/003 403/92

(Continued)

FOREIGN PATENT DOCUMENTS

GB 2041764 A * 9/1980 ............. A61G 1/013
GB 2122501 A * 1/1984 ............. A61G 1/003

(Continued)

OTHER PUBLICATIONS

English language abstract for WO 2021/013484 A1 extracted from espacenet.com database on Aug. 5, 2013, 1 page.

*Primary Examiner* — Robert G Santos
(74) *Attorney, Agent, or Firm* — Howard & Howard Attorneys PLLC

(57) ABSTRACT

A reconfigurable patient transport system may include a patient support apparatus and a patient transport apparatus. The patient support apparatus may include a hinge member, a left support board, and a right support board each coupled to the hinge member. The left support board may comprise a left proximal segment and a left wing segment each removably coupled to a left distal segment. The right support board may comprise a right proximal segment and a right wing segment each removably coupled to a right distal segment. The patient transport apparatus may comprise a support frame and an intermediate frame coupled to the support frame. The intermediate frame may comprise a support deck configured to support a patient. The patient transport apparatus may further comprise a left siderail bracket and a right siderail bracket each configured for engagement with one of the wing segments of the support boards.

20 Claims, 12 Drawing Sheets

(58) Field of Classification Search
USPC .............................. 5/627, 626, 625, 424, 425
See application file for complete search history.

(56) References Cited

U.S. PATENT DOCUMENTS

| | | | | | |
|---|---|---|---|---|---|
| 3,801,208 | A | * | 4/1974 | Bourgraf ............. | E05D 11/1007 403/102 |
| 3,921,231 | A | | 11/1975 | Bourgraf et al. | |
| 4,393,529 | A | * | 7/1983 | Britz ...................... | A61G 7/053 297/130 |
| 4,480,345 | A | * | 11/1984 | Dunn ..................... | A61G 1/003 5/114 |
| 5,023,968 | A | * | 6/1991 | Diehl ..................... | A61G 1/017 5/81.1 R |
| 5,109,555 | A | * | 5/1992 | Fickler ................... | A61G 1/003 5/625 |
| 5,765,243 | A | * | 6/1998 | Duncan ................ | A61B 6/0421 128/870 |
| 6,561,724 | B1 | | 5/2003 | Carletti | |
| 6,568,009 | B2 | | 5/2003 | Linger et al. | |
| 6,722,812 | B1 | | 4/2004 | Carletti et al. | |
| 7,398,571 | B2 | | 7/2008 | Souke et al. | |
| 8,851,079 | B1 | | 10/2014 | Schenck | |
| 9,486,373 | B2 | | 11/2016 | Lambarth et al. | |
| 9,510,981 | B2 | | 12/2016 | Lambarth et al. | |
| 10,154,930 | B2 | | 12/2018 | Heneveld, Jr. et al. | |
| 10,987,268 | B2 | | 4/2021 | Souke et al. | |
| 11,147,726 | B2 | | 10/2021 | Stryker et al. | |
| 11,389,347 | B2 | * | 7/2022 | Xu ......................... | A61G 1/013 |
| 11,826,284 | B2 | * | 11/2023 | Xu ......................... | A61G 1/013 |
| 2001/0044966 | A1 | * | 11/2001 | Linger ................. | A61G 1/0567 5/625 |
| 2012/0186021 | A1 | | 7/2012 | Bonomelli | |
| 2020/0155380 | A1 | | 5/2020 | Xu et al. | |
| 2021/0113393 | A1 | | 4/2021 | Xu et al. | |
| 2021/0186781 | A1 | | 6/2021 | Souke et al. | |
| 2022/0257439 | A1 | | 8/2022 | Guerrier | |
| 2022/0313506 | A1 | * | 10/2022 | Xu ........................... | A61G 1/02 |
| 2023/0285209 | A1 | * | 9/2023 | Herbst ................... | A61G 1/013 |

FOREIGN PATENT DOCUMENTS

| | | | |
|---|---|---|---|
| WO | 2021013484 | A1 | 1/2021 |
| WO | 2021221498 | A1 | 11/2021 |

* cited by examiner

MODULAR STRETCHER FOR PATIENT TRANSPORT APPARATUS

CROSS-REFERENCE TO RELATED APPLICATION

The subject patent application claims priority to and all the benefits of U.S. Provisional Patent Application No. 63/318,086 filed on Mar. 9, 2022, the disclosure of which is hereby incorporated by reference in its entirety.

BACKGROUND

Patient support systems facilitate care of patients in a health care setting. Patient support systems comprise patient transport apparatuses such as, for example, hospital beds, stretchers, cots, tables, wheelchairs, and chairs. A conventional patient transport apparatus generally includes a base and an intermediate frame upon which the patient is supported via one or more deck sections such as a seat section, a fowler section, and the like. In some circumstances, certain types of patient transport apparatuses, such as cots, may include side rails that are positionable in different configurations (e.g., via angled adjustment) to accommodate patients with varying body types and sizes (e.g., bariatric patients).

In certain situations (such as first response scenarios) caregivers must travel to the patient and transport the patient back to an emergency medical facility. Depending on the scenario, caregivers may move the patient from ground surfaces onto cots via stretchers, backboards, and the like before then supporting the patient on a cot, either directly or indirectly. Here, backboards and stretchers are typically realized as separate components from the cot and are stored on the ambulance during periods of non-use. While existing patient support systems have generally performed well for their intended purposes, there remains a need in the art for improved functionality and usability of patient support systems under various operating conditions and with various types of patients.

SUMMARY

In one implementation a reconfigurable patient transport system may comprise a patient support apparatus and a patient transport apparatus. The patient support apparatus may comprise a hinge member, a left support board, and a right support board each coupled to the hinge member and extending longitudinally between a head end and a foot end. The left support board may comprise a left proximal segment and a left wing segment each removably coupled to a left distal segment. The right support board may comprise a right proximal segment and a right wing segment each removably coupled to a right distal segment. The patient transport apparatus may comprise a support frame comprising wheels facilitating movement along a floor surface and an intermediate frame coupled to the support frame. The intermediate frame may comprise a support deck configured to support a patient and may extend longitudinally between a head end and a foot end, and may extend laterally between a left side and a right side. The patient transport apparatus may further comprise a left siderail bracket configured for engagement with the left wing segment of the left support board, and a right siderail bracket configured for engagement with the right wing segment of the right support board.

In another implementation a reconfigurable patient transport system may comprise a patient support apparatus and a patient transport apparatus. The patient support apparatus may comprise a hinge member pivotable about a hinge axis and a left support board and a right support board each coupled to the hinge member. The left support board and the right support board may extend longitudinally along a longitudinal axis between a head end and a foot end. The patient support apparatus may further comprise a left wing segment removably coupled to a left support board and a right wing segment removably coupled to a right support board. The patient transport apparatus may comprise a support frame comprising wheels facilitating movement along a floor surface and an intermediate frame coupled to the support frame. The intermediate frame may comprise a support deck configured to support a patient and may extend longitudinally between a head end and a foot end, and laterally between a left side and a right side. The patient transport apparatus may further comprise a left siderail comprising a connection portion having a siderail profile configured for engagement with the left wing segment and a right siderail comprising a connection portion having a siderail profile configured for engagement with the right wing segment.

In another implementation a patient support apparatus may extending longitudinally along a longitudinal axis between a head end and a foot end. The patient support apparatus may comprise a hinge member comprising a left arm and a right arm pivotably coupled to one another and pivotable about a hinge axis. The patient support apparatus may further comprise a left support board coupled to the left arm of the hinge member and a right support board coupled to the right arm of the hinge member. The left support board may comprise a left proximal segment, a left distal segment removably coupled to the left proximal segment, and a left wing segment removably coupled to the left distal segment. The right support board may comprise a right proximal segment, a right distal segment removably coupled to the right proximal segment, and a right wing segment removably coupled to the right distal segment.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
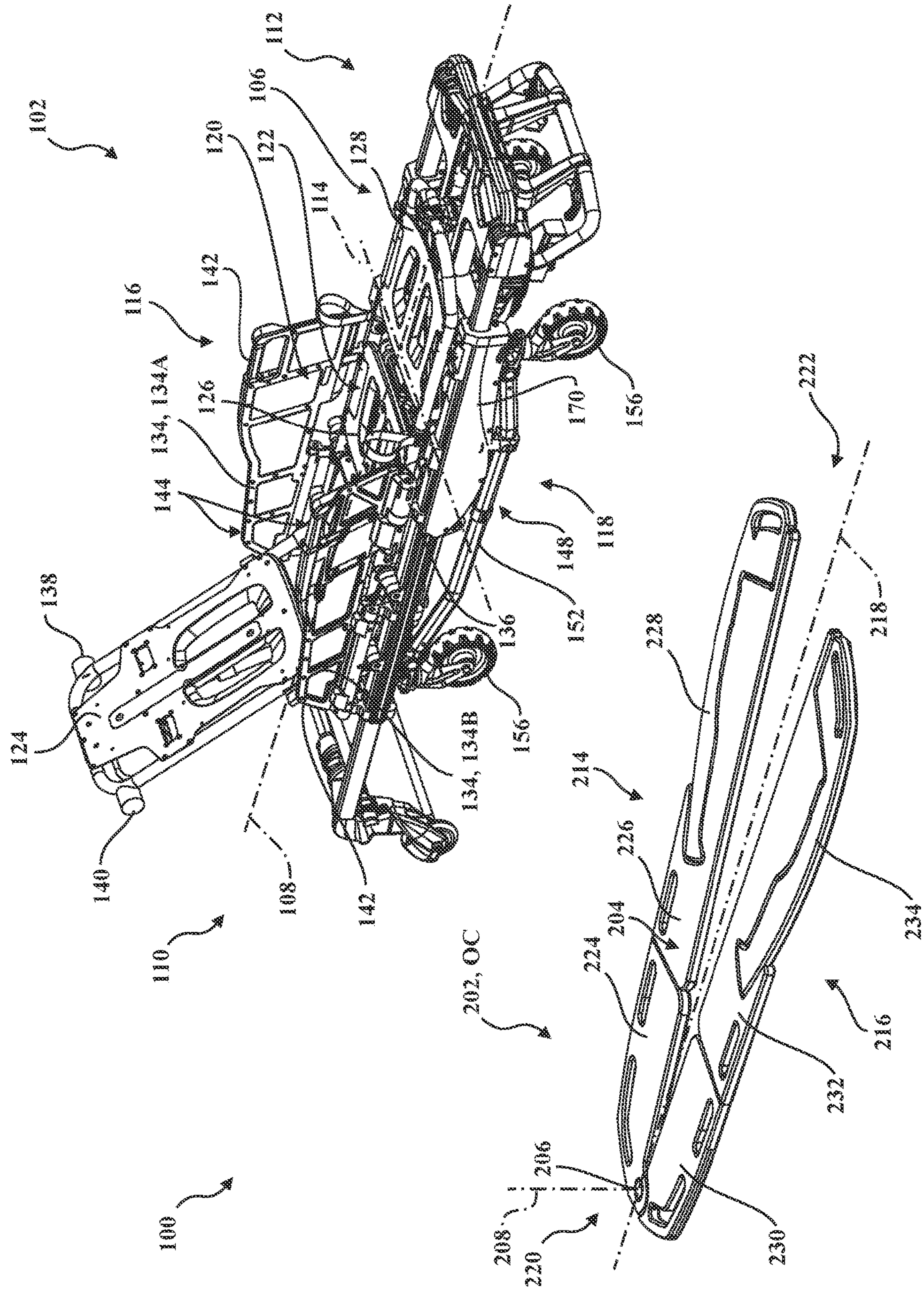
FIG. 1 is a perspective view of a reconfigurable patient transport system showing a patient transport apparatus and a patient support apparatus in an open configuration.

Referring to FIGS. 1-5, a reconfigurable patient transport system 100 is illustrated. The reconfigurable patient transport system comprises a patient transport apparatus 102, to facilitate transportation of a patient in a health care and/or transportation setting, and a patient support apparatus 202, to facilitate lifting and carrying a patient. The patient transport apparatus 102 illustrated in FIGS. 1-5 is realized as a cot, and the patient support apparatus 202 is realized as a scoop stretcher. In other versions, however, the patient transport apparatus 102 may include a hospital bed, table, wheelchair, chair, or similar apparatus utilized in the transportation and care of a patient, and the patient support apparatus 202 may be configured as a backboard, as a stokes basket, and the like. Other configurations are contemplated.

As shown in FIGS. 1-5, the patient transport apparatus 102 includes an intermediate frame 106 configured to support the patient. The intermediate frame 106 can be like that shown in U.S. Pat. No. 10,987,268 B2, which claims priority to U.S. Provisional Patent App. No. 62/488,441, filed on Apr. 21, 2017, entitled, "Emergency Cot with A Litter Height Adjustment Mechanism," the disclosures of which are hereby incorporated by reference in their entirety.

The intermediate frame 106 may extend longitudinally along a longitudinal axis 108 between a head end 110 and a foot end 112. The intermediate frame 106 may further extend laterally along a lateral axis 114 between a left side 116 and a right side 118. The intermediate frame 106 may be coupled to a variety of components that aid in supporting and/or transporting the patient. For example, in FIGS. 1-5, the intermediate frame 106 is coupled to a patient support deck 120 defining a patient support surface 122 upon which the patient directly rests. The patient support deck 120 may be defined by one or more articulable deck sections, for example, a fowler deck section 124, a seat deck section 126, and a leg deck section 128 to facilitate care and/or transportation of the patient in various patient positions.

The intermediate frame 106 may also be coupled to a pair of opposing lateral siderails 134 or side boards. More specifically, a left siderail 134A coupled to the left side 116 of the intermediate frame 106 and a right siderail 134B may be coupled to a right side 118 of the intermediate frame 106. In FIG. 1, the siderails 34 extend from opposing sides of the intermediate frame 106 and provide egress barriers for the patient on the patient support deck 120. The siderails 134 may also be utilized by an individual, such as a caregiver, an emergency medical technician (EMT), or another medical professional, to move or manipulate the patient transport apparatus 102. In some versions, the siderails 134 may include a hinge, pivot, or similar mechanism to allow the siderails 134 to be folded or stored adjacent to or below the patient support deck 120.

One of the siderails 134A, 134B may be disposed along one of the lateral sides and the other one of the siderails 134A, 134B may be disposed along the other one of the lateral sides. More specifically, a left siderail 134A may be coupled to the left side 116 of the intermediate frame 106 and a right siderail 34B may be coupled to a right side 118 of the intermediate frame 106. The pair of siderails 134 may be configured to retain the patient between the siderails 134 on the patient support deck 120. More specifically, the patient may be positioned between the pair of siderails 134, with the pair of siderails 134 engaging the patient to prevent inadvertent movement of the patient laterally off of the patient support deck 120 (e.g., during transport).

The pair of siderails 134 may be pivotable independently of one another between respective first and second positions. As such, one of the pair of siderails 134 may be in the second position to permit ingress/egress of the patient to the patient support deck 120, while the other one of the pair of siderails 134 may be in the first position, which may engage the patient after the patient is placed on the patient support deck 120 (i.e., the other siderails 134 in the first position extends the patient support deck 120 and may present a stop to prevent accidentally pushing the patient off of the patient support deck 120.) However, the pair of siderails 134 may both be simultaneously disposed in either of the first or second positions, and/or to various positions therebetween. In some versions, adjustment of the pair of siderails 134 between the positions may be employed to accommodate patients of different body types or sizes (e.g., bariatric patients). Other configurations are contemplated.

In FIGS. 1-5, the patient transport apparatus 102 further comprises a left siderail bracket (not shown) and a right siderail bracket 136 arranged on opposing lateral sides of the patient transport apparatus 102. The left siderail bracket is coupled to the left side 116 of the intermediate frame 106 and the right siderail bracket 136 is coupled to the right side 118 of the intermediate frame 106. The siderail brackets 136 may be coupled to a variety of locations on the patient transport apparatus 102. For instance, the siderail brackets 136 may be coupled to the siderail 134. In another example, the siderail brackets 136 may be coupled to an underside of the siderail 134 of the intermediate frame 106. In some examples, the siderail brackets 136 may be coupled to the intermediate frame 106. In other examples, however, the siderail brackets 136 may be coupled to a different location on the patient transport apparatus 102. In another example, the siderail brackets 136 may be coupled to the patient support deck 120. In addition to the siderail brackets 136 shown coupled to the intermediate frame 106 in FIGS. 1-5, the patient transport apparatus 102 may further comprise a second left siderail bracket 138 and a second right siderail bracket 140 to removably couple a portion of the patient support apparatus 202 to the intermediate frame 106. Said differently, the pair of second siderail brackets 138, 140 may be coupled to the intermediate frame 106 and longitudinally spaced from the siderail brackets 136. The second left siderail bracket 138 and the second right siderail bracket 140 are configured for engagement with a left proximal segment 224 and the right proximal segment 230 of the patient support apparatus 202. Additionally, other siderail brackets may also be coupled to the intermediate frame 106.

As mentioned above, the siderail brackets 136 may be coupled to the siderails 134. In this instance, the siderail brackets 136 may comprise a connection portion 142 having a siderail profile 144. As will be discussed in further detail below, the siderail profile 144 is configured for complementary engagement with a connection portion 252 of a wing segment 228, 234 of the patient support apparatus 202. The siderail brackets 136 and the connection portion 142 may be formed as a part of the siderails 134 such that the wing segments 228, 234 engage with the siderails 134 in a nesting arrangement. The siderails 134 may further define a siderail socket (not shown) that is configured to receive a portion of the latch 260 coupled to either of the wing segments 228, 234. As will be discussed below, the latch 260 allows the wing segments 228, 234 to be secured to the siderails 134 in order to increase a height of the siderails 134 and improve patient containment.

In other instances the siderail brackets 138, 140 may be positioned near a head end 110 of the patient transport apparatus 102 and coupled to the intermediate frame 106. The siderail brackets 138, 140 may be configured to engage with one of the arms 210, 212 of the hinge member 206, also discussed below. Referring specifically to FIGS. 1-5, the second siderail brackets 138, 140 may be configured to receive a portion of the hinge member 206 such that a proximal segment 224, 230 of the patient support apparatus 202 may be coupled to the intermediate frame 106 of the patient transport apparatus 102 and positioned at the head end 110. In this way, the patient support apparatus 202 can be reconfigured to provide increased utility to a healthcare provider by functioning as an additional siderail for the patient transport apparatus 102.

The patient transport apparatus 102 may further comprise a support frame 146. The support frame 146 may comprise a base 148 and a lift mechanism 150 coupled to the base 148. Best shown in FIG. 5, the base 148 may include two opposing lateral base sides coupled to two opposing longitudinal base sides. The longitudinal base sides may include longitudinally-extending rails 152 and the lateral base sides may include crosswise-extending rails 154 which may be coupled at the ends thereof to the rails longitudinally-extending rails.

The base 148 may further include a plurality of caster wheel assemblies 156 operatively connected adjacent to each corner of the base 148 defined by the longitudinally-extending rails 152 and the crosswise-extending rails 154. As such, the patient transport apparatus 102 of FIGS. 1-5 may include four caster wheel assemblies 156. The wheel assemblies 156 may be configured to swivel to facilitate turning of the patient transport apparatus 102. The wheel assemblies 156 may include a swivel locking mechanism to prevent the wheel assemblies 156 from swiveling when engaged. The wheel assemblies 156 may also include wheel brakes to prevent rotation of the wheel.

Figure 5:
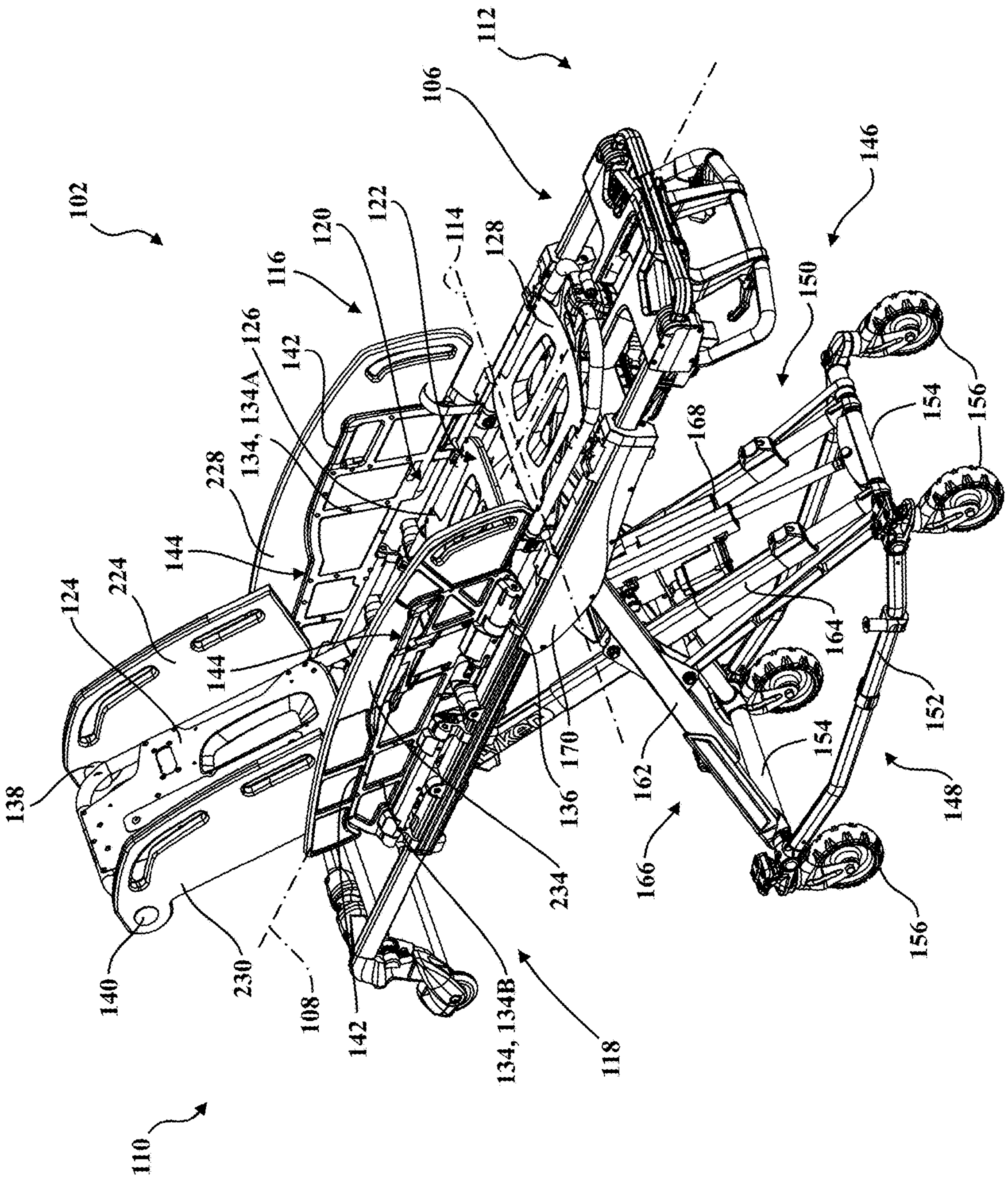
FIG. 5 is a perspective view of the patient transport apparatus of FIG. 4 in a raised position and with the pair of proximal segments and the pair of wing segments coupled to the patient transport apparatus.

The patient transport apparatus 102 may also include a lift mechanism 150 interposed between the base 148 and the intermediate frame 106. The lift mechanism 150 may be configured to move between a plurality of vertical configurations including an extended configuration, where the intermediate frame 106 is elevated relative to the base 148, as shown in FIG. 5, and a retracted configuration (not shown) where the intermediate frame 106 is lowered such that it is in closer proximity to the base 148. The lift mechanism 150 can be like that shown in the U.S. Pat. No. 10,987,268 B2.

While moving between the plurality of vertical configurations, the lift mechanism 150 may move either the base 148 or the intermediate frame 106 relative to the other of the intermediate frame 106 or the base 148 depending on how the patient transport apparatus 102 is supported during use. For example, the patient transport apparatus 102 may be supported at the intermediate frame 106 when the patient transport apparatus 102 is being unloaded/loaded into an emergency response vehicle (not shown) and the patient transport apparatus 102 may be supported at the base 148 when the patient transport apparatus 102 is resting on a surface. In instances where the patient transport apparatus 102 is supported at the intermediate frame 106, the lift mechanism 150, while moving between the plurality of vertical configurations, moves the base 148 relative to the intermediate frame 106. In instances where the patient transport apparatus 102 is supported at the base 148, the lift mechanism 150, while moving between the plurality of vertical configurations, moves the intermediate frame 106 relative to the base 148.

The patient transport apparatus 102 may include a variety of components that allow the lift mechanism 150 to move between the plurality of vertical configurations. For example, in the version of FIGS. 1-5, the patient transport apparatus 102 includes a connector 170 and a slidable member, the slidable member being disposed within a channel 160 of the connector 170 and being moveable between a plurality of different positions in the channel 160. The connector 170 may be coupled to a variety of locations on the patient transport apparatus 102. For example, referring to the version of FIG. 5, the connector 170 may be coupled to the intermediate frame 106. In some examples, the connector 170 may be coupled to an underside of the siderail 34 of the intermediate frame 106. In other examples, however, the connector 170 may be coupled to a different location on the patient transport apparatus 102. For instance, the connector 170 may be coupled to a side of the siderail 34. In another example, the connector 170 may be coupled to the patient support deck 24. Furthermore, while a single connector 170 is shown as being coupled to the intermediate frame 106 in FIG. 5, another connector 170 may be coupled to the intermediate frame 106. For example, another connector 170 may also be coupled to an underside of the intermediate frame 106.

The channel 160 may have various configurations and shapes, e.g., straight, zig-zag, S-shaped, curved, diagonal/sloped, or any combination thereof. In other versions, the channel 160 may have a non-linear shape, a piecewise shape, a curvilinear shape, or any combination of linear or non-linear shapes. The connector 170 and the channel 160 can be like that shown in U.S. Pat. No. 10,987,268 B2.

As previously stated, the patient transport apparatus 102 includes a slidable member, which is disposed in the channel 160 and is moveable between a plurality of different positions in the channel 160. Here, as the slidable member moves between the plurality of different positions within the channel 160, the lift mechanism 150 moves between the plurality of vertical configurations. In this way, each position of the slidable member in the channel 160 corresponds to a vertical configuration of the lift mechanism 150. For example, in the extended configuration of FIG. 5, the slidable member is positioned near a first end of the channel 160. In the retracted configuration (not shown), the slidable member is positioned closer to a second end of the channel

160. The slidable member assembly can be similar to that shown in U.S. Pat. No. 10,987,268 B2.

In FIG. 5, the lift mechanism 150 includes a first frame member 162 and a second frame member 164, both of which are coupled to the intermediate frame 106 and the base 148. A first end of the second frame member 164 may be pivotally coupled to the head end 110 of the intermediate frame 106 at a connection point such that the second frame member 164 may pivot about the connection point. A second end of the second frame member 164 may be pivotally coupled to a foot end 112 of the base 148 at a connection point such that the second frame member 164 may pivot about the connection point. Furthermore, a first end of the first frame member 162 may be pivotally coupled to a foot end 112 of the intermediate frame 106 via the slidable member. More specifically stated, and as shown in FIG. 5, the first end may be pivotally coupled to the slidable member, which is disposed in the channel 160 of the connector 170, which is coupled to the intermediate frame 106.

As such, the first frame member 162 is pivotally coupled to the intermediate frame 106 and may pivot about the slidable member. Also shown, a second end of the first frame member 162 may be pivotally coupled to a head-end of the base 148 at a connection point such that the first frame member 162 may pivot about the connection point. Furthermore, the first frame member 162 and the second frame member 164 may be pivotally coupled to each other at the pivot axle to form an "X" frame 166.

The lift mechanism 150 may include a second, similarly constructed X frame 166, which may include a third frame member and a fourth frame member. Similar to X frame 166, the third frame member and the fourth frame member may be pivotally coupled to a side of the intermediate frame 106 and a side of the base 148. For example, the third frame member and the fourth frame member of X frame 166 may be pivotally coupled to a side of the intermediate frame 106 and a side of the base 148, which oppose a side of the intermediate frame 106 and a side of the base 148 to which the first frame member 162 and the second frame member 164 are coupled. It will be appreciated that any reference herein to the first frame member 162 may also be a reference to the third frame member. Similarly, any reference to the second frame member 164 may also be a reference to the fourth frame member.

In FIG. 1, the frame members 162, 164 are hollow and telescopingly include further frame members. The further frame members may be supported for movement into and out of the respective frame members 162, 164 to extend a length of the respective frame members 162, 164. In the version shown in FIGS. 1-5, the further frame members extend out of frame members 162, 164 toward the base 148. However, in other examples, the further frame members may extend out of frame members 162, 164 toward the intermediate frame 106. In these examples, frame members 162, 164 are coupled to the base 148 or the intermediate frame 106 via further frame members. However, in other examples, the frame members 162, 164 may be of a fixed length and exclude further frame members. Additionally, while the lift mechanism 150 of the representative version illustrated in FIGS. 1-5 includes four frame members 162, 164 the lift mechanism 150 may include any suitable number of frame members.

As previously stated, the slidable member is coupled to the first end of the first frame member 162 and, therefore, the first end of the first frame member 162 and the slidable member may be integrally moveable along the length of the channel 160. As such, as the slidable member moves between the plurality of positions in the channel 160, the lift mechanism 150 moves between the plurality of vertical configurations, which correspond to the position of the slidable member.

Those having ordinary skill in the art will appreciate that the lift mechanism 150 may move between the plurality of vertical configurations due to a patient care provider applying a manual action to the lift mechanism 150, or components thereof. Additionally, or alternatively, the patient transport apparatus 102 may include one or more actuators 168, which may be coupled to any suitable component of the lift mechanism 150 and may be configured to move the lift mechanism 150 between the plurality of vertical configurations. As shown in FIG. 5, the illustrated actuator 168 is realized as a hydraulic linear actuator, which is connected to and extends between the base 148 and the intermediate frame 106. In this particular version, the hydraulic linear actuator includes a cylindrical housing fastened to intermediate frame 106, the cylindrical housing including a reciprocal rod having a piston (not shown) located within the cylindrical housing. The distal end of the reciprocal rod is connected by a joint to the base 148. The joint allows pivotal movement about two orthogonally related axes. Extension and retraction of the reciprocal rod will facilitate movement of the frame members of the lift mechanism 150 about the axis of the reciprocal rod.

The actuator 168 is further described in U.S. Pat. No. 7,398,571, filed on Jun. 30, 2005, entitled, "Ambulance Cot and Hydraulic Elevating Mechanism Therefor," the disclosure of which is hereby incorporated by reference in its entirety. Furthermore, techniques for utilizing actuator 168 to manipulate the components of the patient transport apparatus 102 can be like those described in U.S. Pat. No. 10,987,268 B2.

In some versions, the actuator 168 may not be the hydraulic linear actuator shown in FIG. 5. The actuator 168 may be any actuator suitable for actuating the lift mechanism 150 such that the lift mechanism 150 moves between the plurality of vertical configurations. For example, the actuator 168 may be an electric motor, a servo motor, a pneumatic actuator, or any other suitable actuator.

In some embodiments, the patient transport apparatus 102 may comprise a reconfigurable patient support as described in U.S. Pat. No. 9,486,373, which is hereby incorporated by reference in its entirety. In some embodiments, the patient transport apparatus 102 may comprise a reconfigurable transport apparatus as described in U.S. Pat. No. 9,510,981, which is hereby incorporated by reference in its entirety. In some embodiments, the patient transport apparatus 102 may comprise a person support apparatus system as described in U.S. Pat. No. 11,147,726 B2, which is hereby incorporated by reference in its entirety. In some embodiments, the patient transport apparatus 102 may comprise an ambulance cot as described in U.S. Pat. No. 7,398,571, which is hereby incorporated by reference in its entirety.

In addition to the patient transport apparatus 102 described above, the reconfigurable patient transport system further comprises the patient support apparatus 202 as noted above and as is depicted positioned adjacent to the patient transport apparatus 102 in FIGS. 1-5. Here, the patient support apparatus 202 (also referred to as a "support apparatus"), is realized as a multi-component, articulable scoop stretcher. However, as noted above, other configurations are contemplated.

The support apparatus 202 may be usable in combination with, or separately from, the patient transport apparatus 102.

Figure 8:
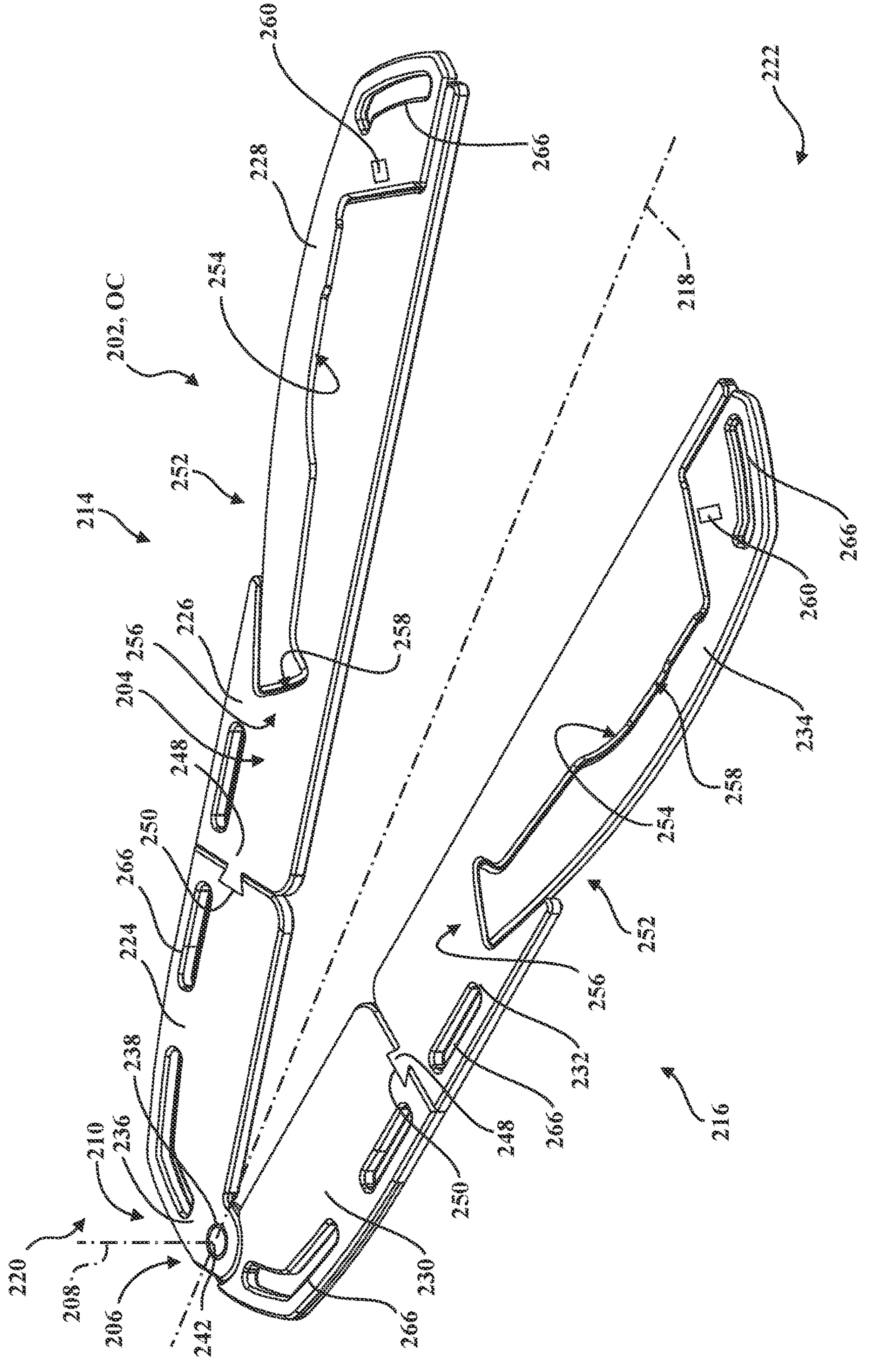
FIG. 8 is a perspective view of the patient support apparatus of FIG. 6 in the open configuration.

For example, the support apparatus 202 may be used to transfer a patient onto a transport apparatus, between two transport apparatuses, and/or onto other medical and surgical systems, such as an MRI table. In some versions, the support apparatus 202 may also be utilized to move an injured bariatric patient from the ground onto a transport apparatus 102 by first placing the support apparatus 202 in an open configuration OC, shown in FIGS. 1 and 8, to facilitate placing a patient on the support apparatus 202 efficiently and comfortably.

Figure 6:
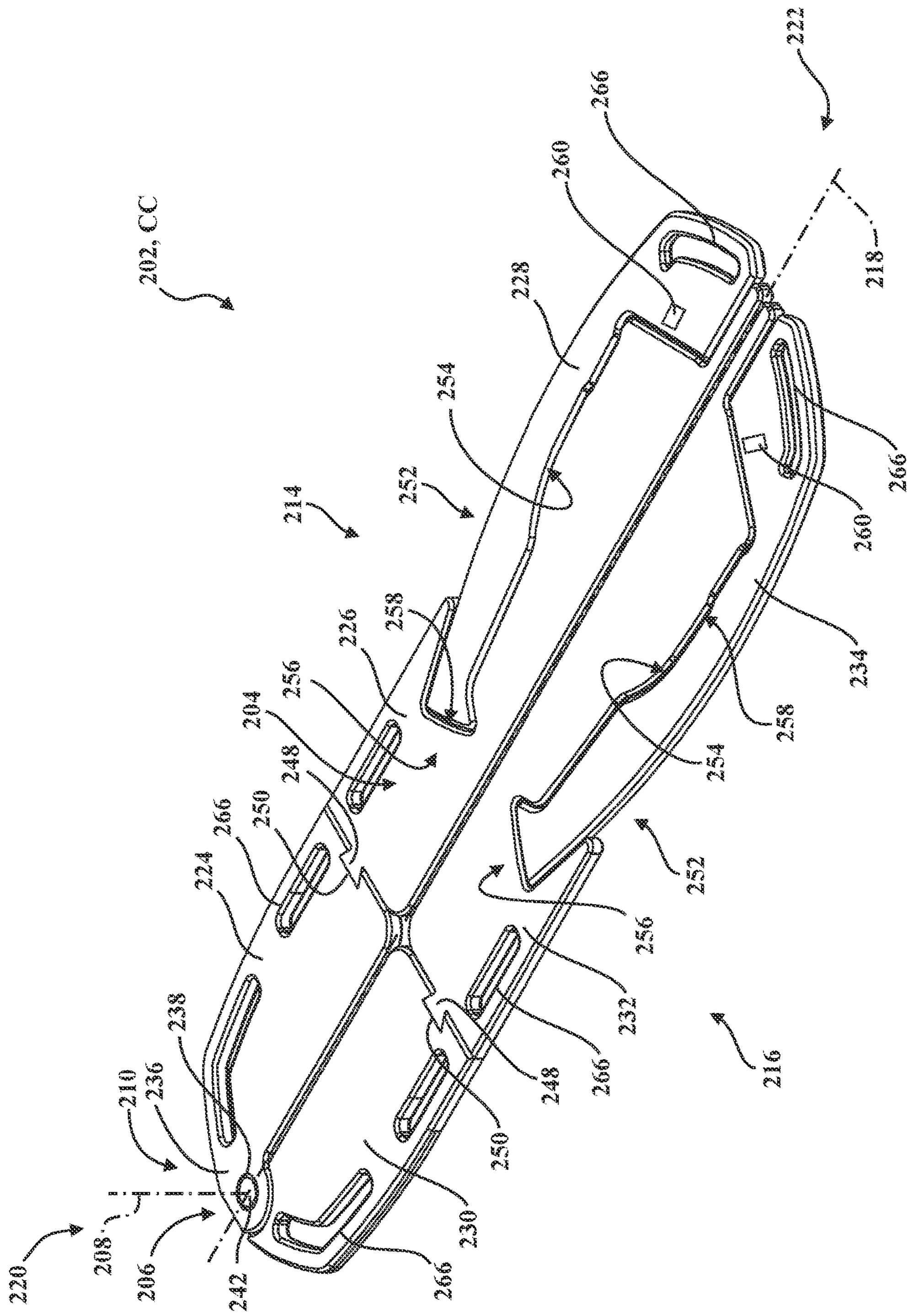
FIG. 6 is a perspective view of the patient support apparatus of FIG. 1 in the closed configuration showing a left support board and a right support board.
Figure 7:
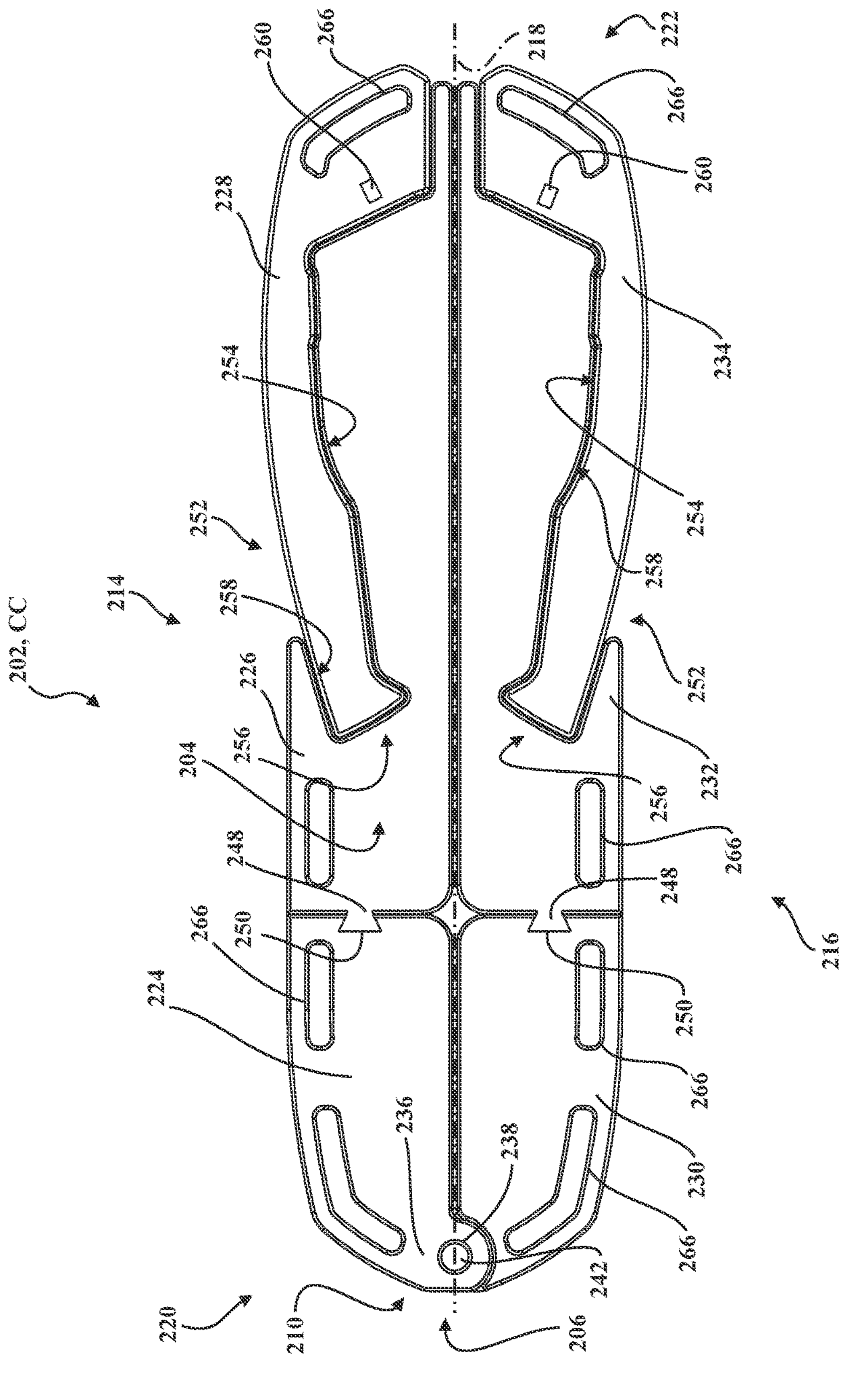
FIG. 7 is a top-side view of the patient support apparatus of FIG. 6 in the closed configuration.

In order to facilitate recovery of a patient who is situated on the ground the patient support apparatus 202 may comprise several components that cooperate to define a support surface 204. The patient support apparatus 202 may comprise a hinge member 206, pivotable about a hinge axis, and left and right support boards 214, 216 each coupled to the hinge member 206. More specifically, the support apparatus 202 may comprise a left support board 214 coupled to the hinge member 206 and a right support board 216 coupled to the hinge member 206. The hinge member 206 facilitates pivoting movement of the left support board 214 and the right support board 216 relative to one another about the hinge axis 208. Said differently, the left support board 214 is pivotable relative to the right support board 216 between a closed configuration CC, shown in FIGS. 2 and 6, and an open configuration OC, shown in FIGS. 1 and 8. Each of the left and right support boards 214, 216 may define handles 266 that facilitate grasping and carrying the patient support apparatus 202.

In one implementation of the support apparatus 202, the hinge member 206 may comprise a left arm 210 and a right arm 212 pivotably coupled to one another and pivotable about the hinge axis 208. Each of the left arm 210 and the right arm 212 may be coupled to the respective left support board 214 and the right support board 216. Said differently, the left arm 210 of the hinge member 206 may be coupled to the left support board 214 and the right arm 212 of the hinge member may be coupled to the right support board 216. In some implementations of the support apparatus 202 the hinge member 206 may be integrated with the left and right support boards 214, 216 and the left arm 210 separable from the right arm 212. In other implementations the hinge member 206 may be removably coupled to the left and right support boards 214, 216 with the left arm 210 pivotably coupled to the right arm 212.

Each of the left and right support boards 214, 216 extends longitudinally along a longitudinal axis 218 between a head end 220 and a foot end 222 and may further comprise one or more individual segments removably coupled to one another. As shown in FIGS. 6-10, the left support board 214 may comprise a left proximal segment 224, a left distal segment 226, and a left wing segment 228. Likewise, the right support board 216 may comprise a right proximal segment 230, a right distal segment 232, and a right wing segment 234.

Both the left proximal segment 224 and the left wing segment 228 may be coupled to the left distal segment 226. In some implementations the left proximal segment 224 and the left distal segment 226 may be combined in a single piece and form the left support board 214, to which the left wing segment 228 may be coupled. Similarly, on the right support board 216, both the right proximal segment 230 and the right wing segment 234 may be coupled to the right distal segment 232. In some implementations the right proximal segment 230 and the right distal segment 232 may be combined in a single piece and form the right support board 216, to which the right wing segment 234 may be coupled.

It should be appreciated that the left support board 214 and the right support board 216 are generally similar to one another in construction and operation. Some implementations of the left support board 214 and the right support board 216 may be symmetrical about the longitudinal axis 218, and as such, corresponding parts are described with corresponding terms and designated with left or right relative to a patient supported on the support apparatus 202. However, these terms are not limited to the specific arrangement shown here and used merely for convenience.

Figure 2:
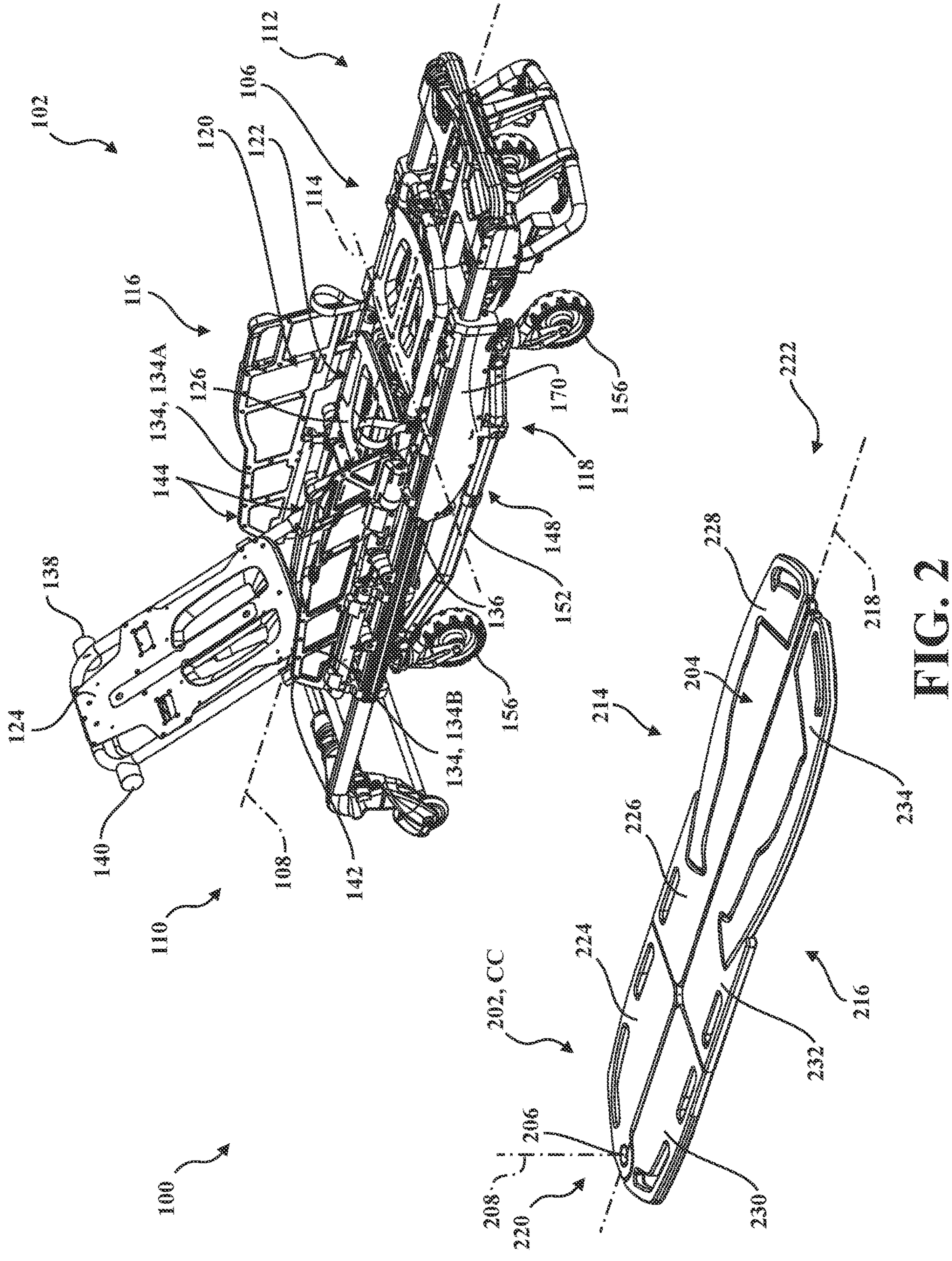
FIG. 2 is another perspective view of the reconfigurable patient transport system of FIG. 1 with the patient support apparatus shown in a closed configuration.
Figure 3:
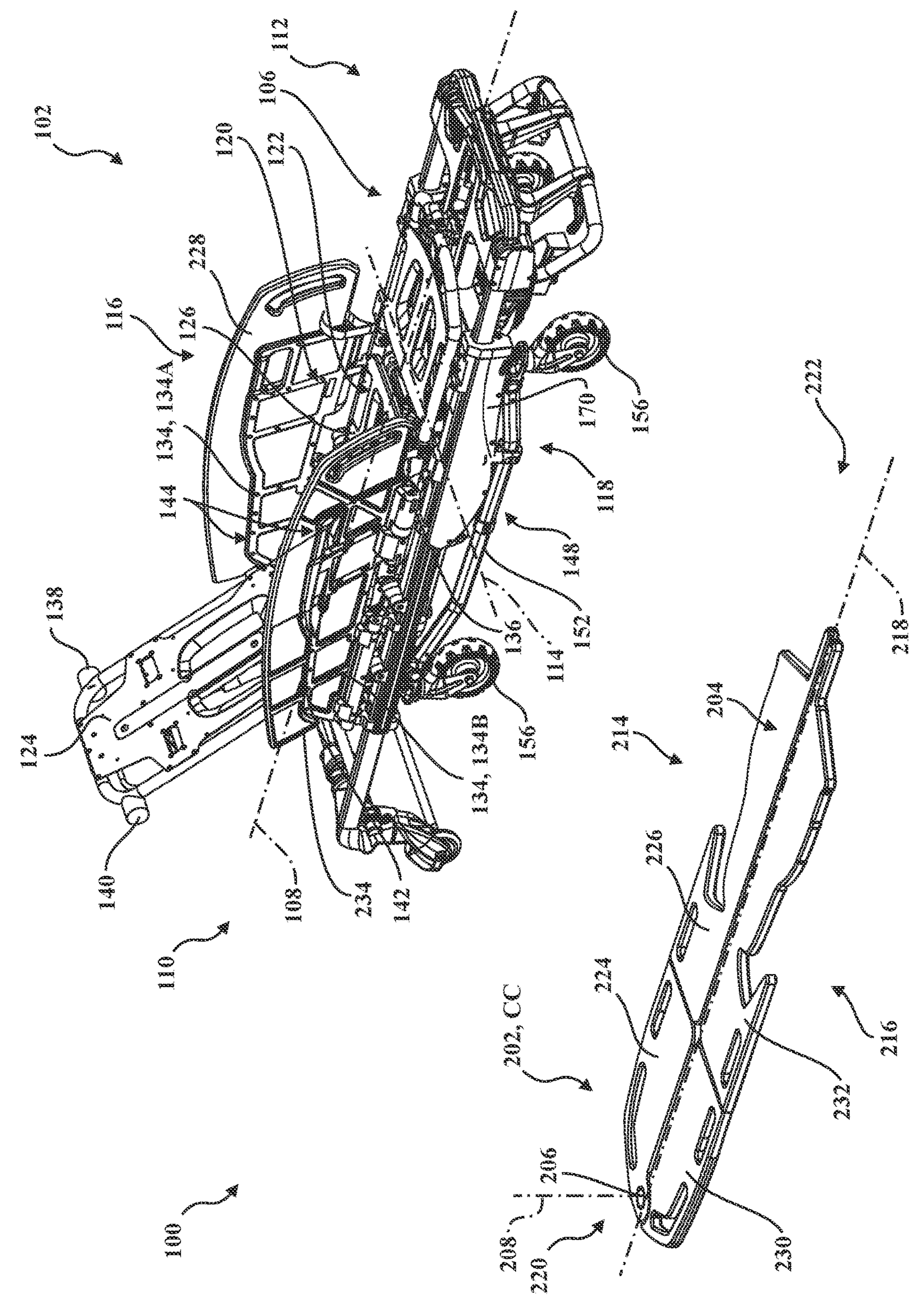
FIG. 3 is another perspective view of the reconfigurable patient transport system of FIG. 1 with a pair of wing segments separated from the patient support apparatus and coupled to siderails of the patient transport.
Figure 11:
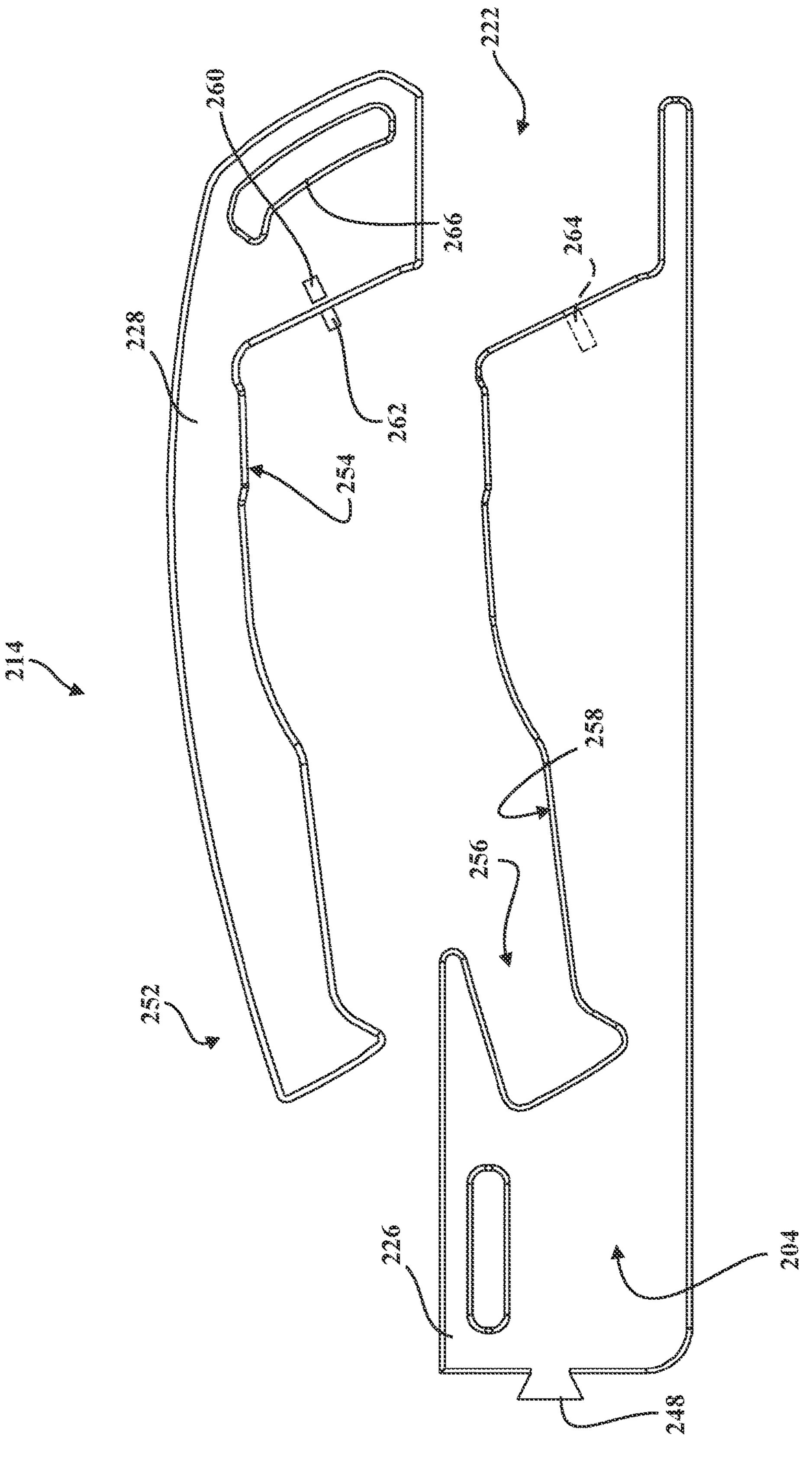
FIG. 11 is a close up top-side view of the patient support apparatus of FIG. 8 showing the left wing segment separated from the left distal segment.
Figure 12:
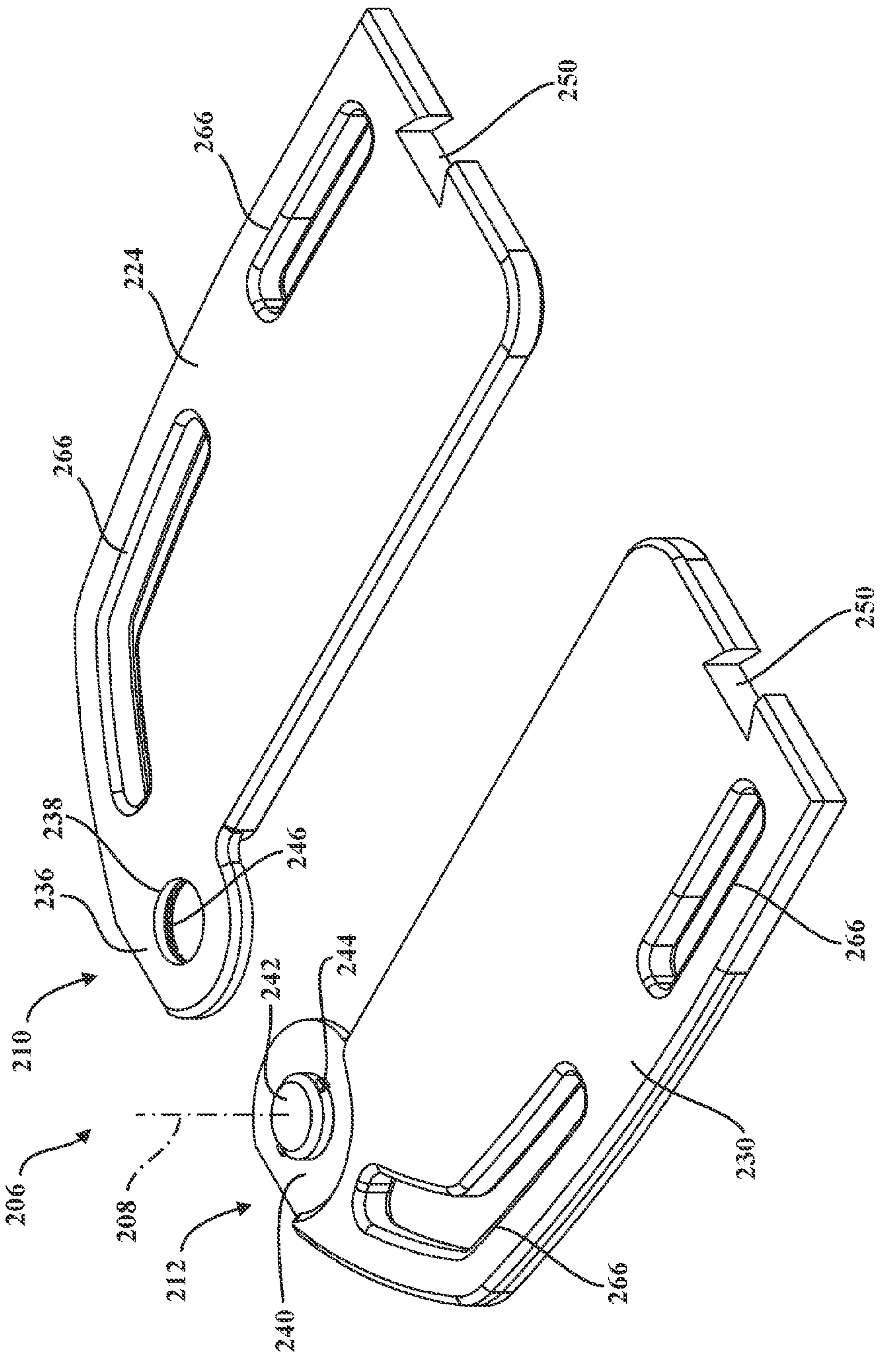
FIG. 12 is a close up perspective view of the proximal segments and the hinge member showing details of the left arm and the right arm.

As best shown in FIGS. 6-12, the left arm 210 and the right arm 212 of the hinge member 206 are configured to facilitate movement of the left and right support boards 214, 216 between the open configuration OC, shown in FIG. 1, and the closed configuration CC, shown in FIG. 2. Referring to specifically to FIG. 12, the left arm 210 of the hinge member 206 may comprise an eye portion 236 defining a socket 238. The right arm 212 of the hinge member 206 may comprise a body portion 240 and a stub shaft 242 protruding from the body portion 240 to define the hinge axis 208. The stub shaft 242 may be received in the socket 238 to facilitate pivoting of the left and right arms 210, 212. Specifically, the stub shaft 242 is inserted in the socket 238 such that the body portion 240 is adjacent to the eye portion 236.

One exemplary implementation of the hinge member 206, the thickness may be reduced by offsetting the eye portion 236 and the body portion 240 in opposite directions along the hinge axis 208. Here, the eye portion 236 may be offset toward the support surface 204 of the support apparatus 202 and the body portion 240 may be offset away from the support surface 204 toward a bottom side of the support apparatus 202. Offsetting the body portion 240 and the eye portion 236 by reducing the thickness of each allows the assembled hinge member 206 to be as thin as the left and right support boards 214, 216.

As mentioned above, the left support board 214 and the right support board 216 may be removably coupled to one another. In the embodiment shown in FIG. 9, the left and right support boards 214, 216 separate at the hinge member 206. The stub shaft 242 may be removed from the socket 238 to separate the left support board 214 from the right support board 216. The stub shaft 242 may be retained in the socket 238 with a variety of mechanisms. For example, the stub shaft 242 may comprise one or more step projections 244 that are engageable with one or more corresponding slot recesses 246 defined in the socket 238 to form a bayonet coupler. In the closed configuration CC, the slot recesses 246 capture the step projections 244 and retain the stub shaft 242 in the socket 238. To separate the left and right support boards 214, 216 the support apparatus 202 may be placed in an extended open configuration (not shown), beyond the open configuration OC, in which the step projections 244 are disengaged from the slot recesses 246, which allows the stub shaft 242 to be removed from the socket 238 along the hinge axis 208.

In the alternative to the above described bayonet coupler the left arm 210 may be secured to the right arm 212 by way of a threaded fastener (not shown). Further, the left and right arms 210, 212 may be secured to each other using a cross-pin, an automatic coupler, and other couplers sufficient to prevent movement along the hinge axis 208. Further still, the hinge member 206 may comprise a stub shaft 242 that is separate from both the left arm and the right arm (not shown). For example, both of the left and right arms 210, 212 may comprise several fingers that are arranged to interlock with the fingers of the opposing arm. Each of the fingers may define a hole aligned along the hinge axis 208 and configured to receive the stub shaft 242, which prevents the fingers from being separated while the stub shaft 242 is installed. The stub shaft 242 may be retained using a cross pin, a threaded fastener, the stub shaft 242 may have a threaded portion. Additionally, the stub shaft 242 may be a quick release pin, which comprises one or more spring loaded retaining balls that are engageable with a corresponding groove in either of the left and right arms 210, 212.

In yet another implementation of the hinge member 206, the left arm 210 and the right arm 212 may be permanently or semi-permanently coupled in a way not readily separable by a user. In this implementation, each of the left arm 210 and the right arm 212 may be configured to be separated from the respective left and right support boards 214, 216. Specifically, the left arm 210 is removably coupled to the left support board 214 and the right arm 212 is removably coupled to the right support board 216. Each of the support boards 214, 216 may define a hinge receiver (not shown) that receives a portion of the corresponding arm and a latch or coupler for retaining the arm in the hinge receiver. Other implementations are contemplated.

Figure 9:
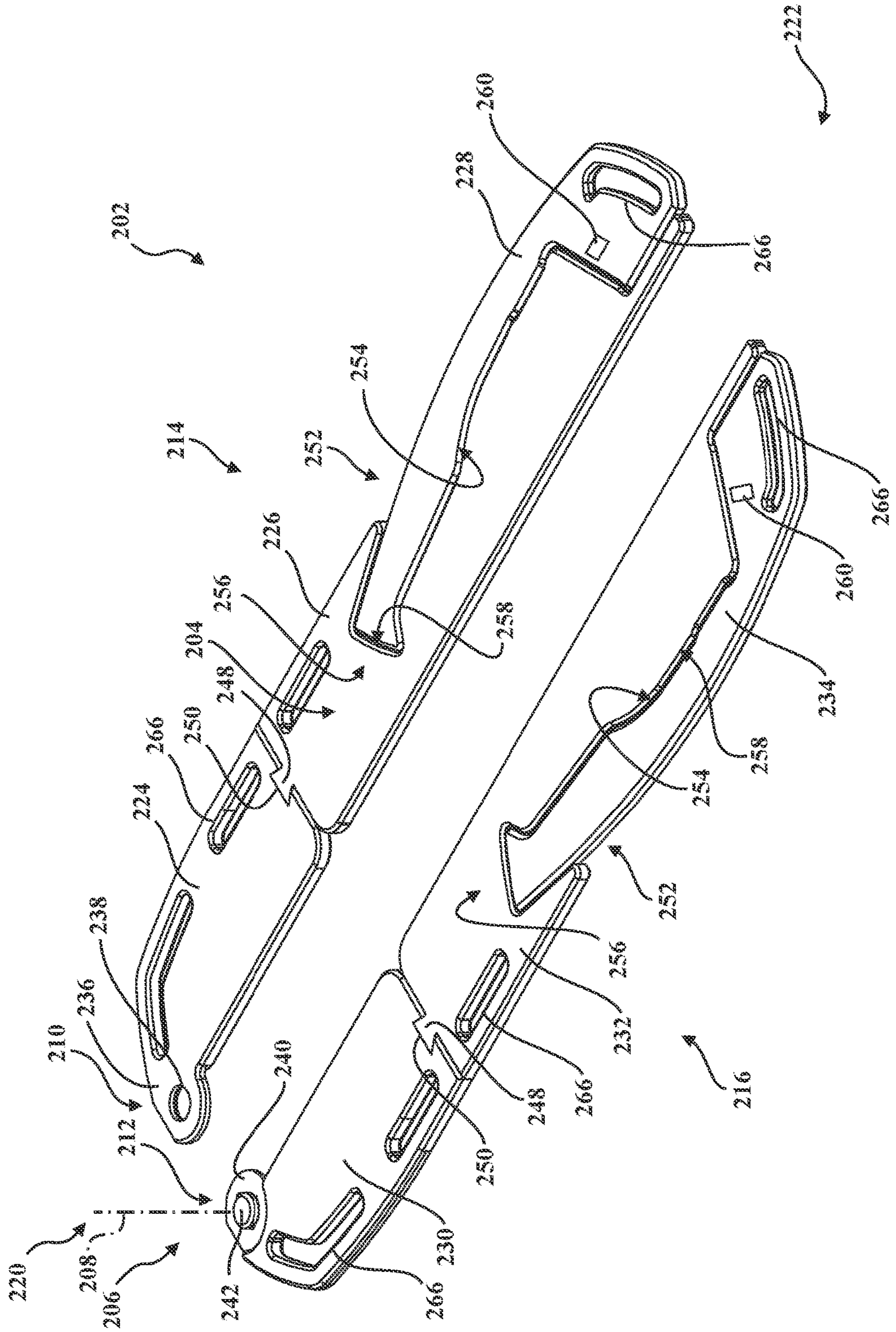
FIG. 9 is a perspective view of the patient support apparatus of FIG. 6 showing the left support board separated from the right support board at a hinge member having a left arm and a right arm.
Figure 10:
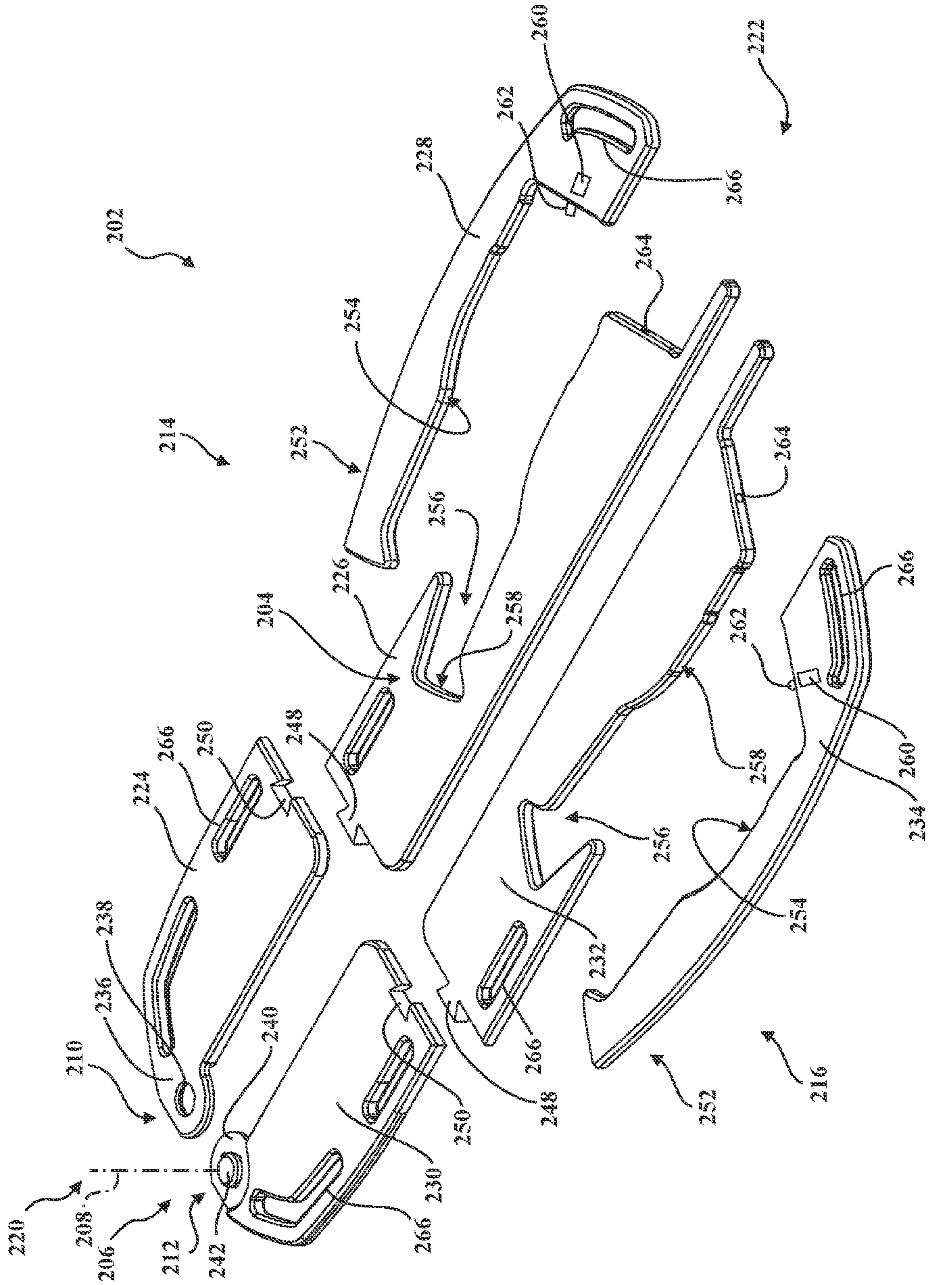
FIG. 10 is a perspective view of the patient support apparatus of FIG. 8 showing the left and right support boards disassembled into corresponding wing segments, proximal segments, and distal segments.

Turning now to FIG. 9, the support apparatus 202 is shown with the left support board 214 separated from the right support board 216. As mentioned above, the left support board 214 comprises the left proximal segment 224, the left distal segment 226, and the left wing segment 228. Here the left proximal segment 224 and the left wing segment 228 are each coupled to the left distal segment 226. The left proximal segment 224 is generally arranged at a first end, generally referred to as the head end 220, and the left distal segment 226 is generally arranged at a second end, generally referred to as the foot end 222. The left proximal segment 224 is arranged between the hinge member 206, having a first end coupled to the left arm 210 and a second end coupled to the left distal segment 232.

The left proximal segment 224 may be coupled to the left distal segment 226 using one or more different mechanisms depending on the implementation. For example, the second end of the left proximal segment 224 may comprise one or more dovetail protrusions 248 that are engageable with corresponding dovetail slots 250 defined in the left distal segment 226. In some implementations the left proximal segment 224 may define the dovetail slots 250 and the left distal segment 226 may comprise the dovetail protrusions 248. It is further possible that the left proximal segment 224 and the left distal segment 226 each include both the dovetail protrusions 248 and the dovetail slots 250 in an alternating arrangement. Other implementations are contemplated.

Similar to the left support board 214 described above, the right support board 216 comprises the right proximal segment 230, the right distal segment 232, and the right wing segment 234. Here the right proximal segment 230 and the right wing segment 234 are each coupled to the right distal segment 232. The right proximal segment 230 may be arranged at a first end, generally referred to as the head end 220, and to the right distal segment 232 may be arranged at a second end, generally referred to as the foot end 222. The right proximal segment 230 is arranged between the hinge member 206, having a first end coupled to the right arm 212 and a second end coupled to the right distal segment 232.

The right proximal segment 230 may be coupled to the right distal segment 232 using one or more different mechanisms depending on the implementation. For example, the second end of the right proximal segment 230 may comprise one or more dovetail protrusions 248 that are engageable with corresponding dovetail slots 250 defined in the right distal segment 232. In some implementations the right proximal segment 230 may define the dovetail slots 250 and the right distal segment 232 may comprise the dovetail protrusions 248. It is further possible that the right proximal segment 230 and the right distal segment 232 each include both the dovetail protrusions 248 and the dovetail slots 250 in an alternating arrangement. Other implementations are contemplated.

In FIG. 11, the left wing segment 228 is shown separated from the left distal segment 226. The left wing segment 228 comprises a connection portion 252 having an engagement profile 254. The left distal segment 226 defines a connection slot 256 having a complementary engagement profile 258. The connection slot 256 of the left distal segment 226 is configured to receive the connection portion 252 of the left wing segment 228 to removably couple the left wing segment 228 to the left distal segment 226. Coupling the left wing segment 228 to the left distal segment 226 increases the support surface 204 area of the left support board 214 upon which the patient may be supported.

The connection slot 256 is shaped such that the engagement profile 258 constrains movement in two directions when the connection portion of the left wing segment 228 is received in the connection slot 256 of the left distal segment 226. Said differently, when the left wing segment 228 is coupled to the left distal segment 226, the shape of the engagement profile 254, 258 prevents movement of the left wing segment 228 relative to the left distal segment 226. The engagement profile 254, 258 shown here prevents movement in a direction parallel to the longitudinal axis 218 and in a direction perpendicular to the longitudinal axis 218. As such, a force applied to the left wing segment 228 can be transferred to the left distal segment 226 to pivot the left support board 214 relative to the right support board 216 without separating.

To this end, the connection slot 256 of the left support board 214 may be configured to receive the connection portion 252 of the left wing segment 228 in a direction parallel to the hinge axis 208 to facilitate removably coupling the left wing segment 228 to the left support board 214. Said differently, the connection portion 252 of the left wing segment 228 may be positioned above the patient support surface 204 and aligned with the connection slot 256 of the left distal segment 226 and moved toward the left distal segment 226 such that the engagement profiles 254, 258 nest within each other.

Similar to above, the right wing segment 234 comprises a connection portion 252 having an engagement profile 254. The right distal segment 232 defines a connection slot 256 having a complementary engagement profile 258. The connection slot 256 of the right distal segment 232 is configured to receive the connection portion 252 of the right wing segment 234 to removably couple the right wing segment 234 to the right distal segment 232. Coupling the right wing segment 234 to the right distal segment 232 increases the support surface area 204 of the right support board 216 upon which the patient may be supported.

The connection slot 256 is shaped such that the engagement profile 254, 258 constrains movement in two directions when the connection portion 252 of the right wing segment 234 is received in the connection slot 256 of the right distal segment 232. Said differently, when the right wing segment 234 is coupled to the right distal segment 232, the shape of the engagement profile 254, 258 prevents movement of the right wing segment 234 relative to the right distal segment 232. The engagement profile 254, 258 shown here prevents movement in a direction parallel to the longitudinal axis 218 and in a direction perpendicular to the longitudinal axis 218. As such, a force applied to the right wing segment 234 can be transferred to the right distal segment 232 to pivot the right support board 216 relative to the left support board 214 without separating.

To this end, the connection slot 256 of the right support board 216 may be configured to receive the connection portion 252 of the right wing segment 234 in a direction parallel to the hinge axis 208 to facilitate removably coupling the right wing segment 234 to the right support board 216. Said differently, the connection portion 252 of the right wing segment 234 may be positioned above the patient support surface and aligned with the connection slot 256 of the right distal segment 232 and moved toward the right distal segment 232 such that the engagement profiles 254, 258 nest within each other.

Once either or both the left and right wing segments 228, 234 have been coupled to the respective left and right distal segments 226, 232 a latch 260 may be actuated to prevent unintended removal. Here, the latch 260 is implemented as a pin 262 and socket 264 that are engageable to prevent relative movement therebetween. More specifically, the pin 262 is movably coupled to the wing segment 228, 234 and a corresponding socket 264 is defined in the distal segment 226, 232. Assembly of the wing segment 228, 234 and the distal segment 226, 232 aligns the pin 262 with the socket 264 such that the latch 260 can be actuated to engage the pin 262 with the socket 264. Conversely, prior to removal of the wing segment 228, 234 from the distal segment 226, 232 the latch 260 may be actuated to disengage the pin 262 from the socket 264, which allows the wing segment 228, 234 to be separated from the distal segment 226, 232. In other implementations of the support apparatus 202, the latch 260 may take other forms such as an automatic latch, a powered or electronic latch, or other latches sufficient to prevent movement parallel to the hinge axis 208 between the wing segment 228, 234 and the distal segment 226, 232.

Figure 4:
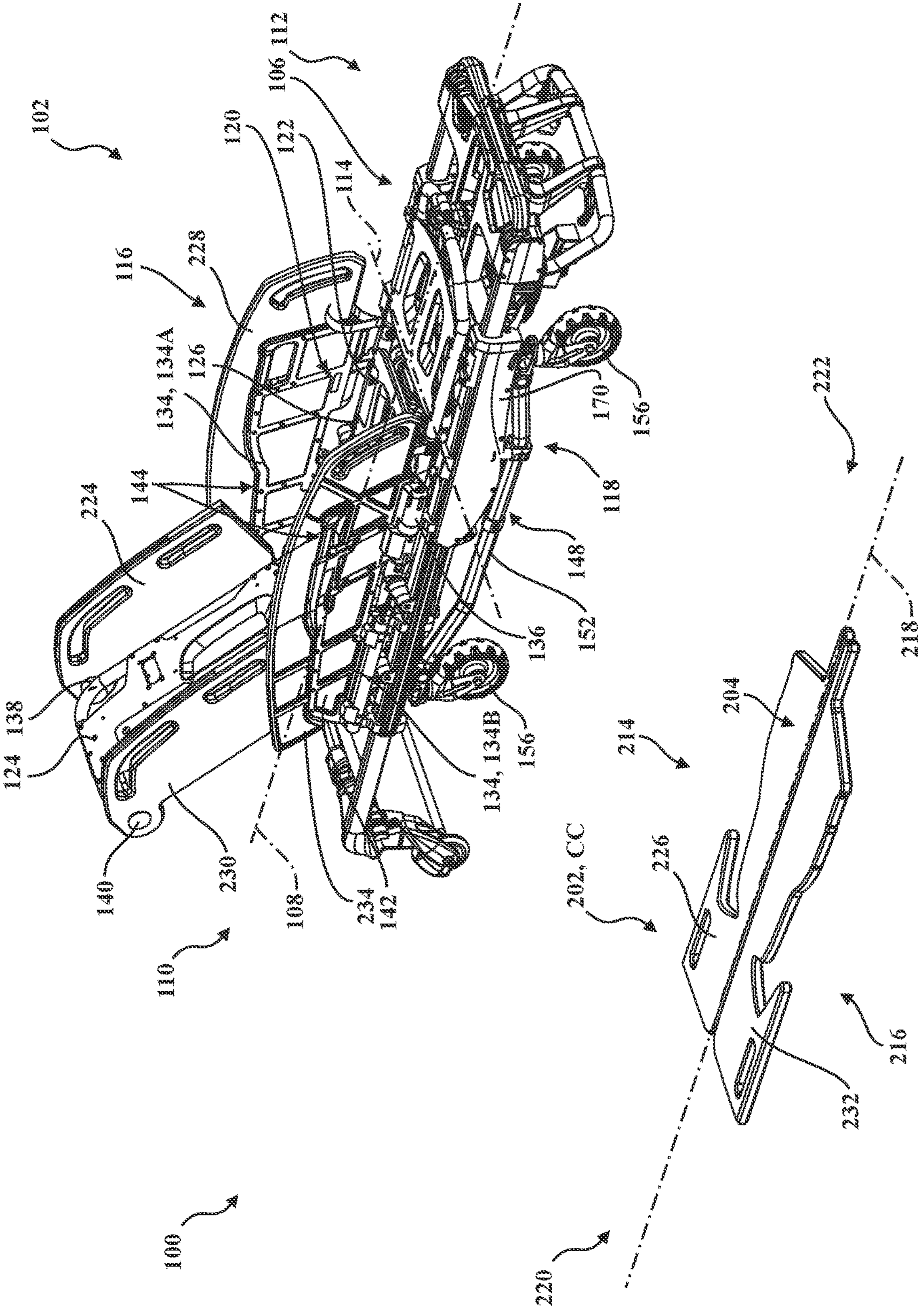
FIG. 4 is a perspective view of the reconfigurable patient transport system of FIG. 3 with a pair of proximal segments separated from the patient support apparatus and coupled to a pair of siderail brackets of the patient transport.

As mentioned above, the left and right wing segments 228, 234 are shaped so as to be removably coupled to the siderails 34 of the patient transport apparatus 102. A user can separate either of the wing segments 228, 234 from the support boards 214, 216 and transfer the wing segments 228, 234 to the patient transport apparatus 102 to increase the size of the siderails 134. The wing segments 228, 234 may be coupled to the siderails 134 in a manner similar to the distal segments 226, 232, by aligning the engagement profile 254 of each wing segment 228, 234 with the siderail profile 144 of each siderail 134 and engaging the latch 260 to secure the wing segments 228, 234. Conversely, each of the wing segments 228, 234 may be separated from the siderails 134 by disengaging the latch 260 and moving the wing segment 228, 234 away from the siderail 134. It will be appreciated that attachment of the proximal segments 224, 230 and/or the wing segments 228, 234 may be utilized to provide enhanced stability and/or comfort to certain patients, such as relatively large bariatric patients, when situated on the patient transport apparatus 102. In some versions, the proximal segments 224, 230 and/or the wing segments 228, 234 may be secured to the patient transport apparatus 102 without necessarily utilizing the distal segments 226, 232 to support the patient (e.g., as is depicted in FIG. 4), in which case the distal segments 226, 232 could be stored on an ambulance or in another location. It is also contemplated that the patient support apparatus 220 could be used to transfer a patient onto the patient transport apparatus 102 and then the proximal segments 224, 230 and/or the wing segments 228, 234 could then be removed from the distal segments 226, 232 and could be subsequently secured to the patient transport apparatus 102 while the distal segments 226, 232 remain disposed underneath the patient's body. Other configurations are contemplated.

As with above, alternative latch mechanisms are contemplated, such as an automatic latch, a sliding connection, an electronic latch, a pivot latch, and the like. It should further be appreciated that either of the left wing segment 228 or the right wing segment 234 may be coupled to either of the left siderail 134A or the right siderail 134B. More specifically, the left wing segment 228 may be coupled to both the left siderail 134A or the right siderail 134B, and the right wing segment 234 may be coupled to both the left siderail 134A or the right siderail 134B.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A reconfigurable patient transport system comprising:
a patient support apparatus comprising:
a hinge member;
a left support board and a right support board each coupled to the hinge member and extending longitudinally between a head end and a foot end,
wherein the left support board comprises a left proximal segment and a left wing segment each removably coupled to a left distal segment, and
wherein the right support board comprises a right proximal segment and a right wing segment each removably coupled to a right distal segment; and
a patient transport apparatus comprising:
a support frame comprising wheels facilitating movement along a floor surface,
an intermediate frame coupled to the support frame and comprising a support deck configured to support a patient, with the intermediate frame extending longitudinally between a head end and a foot end, and laterally between a left side and a right side,
a left siderail bracket configured for engagement with the left wing segment of the left support board, and
a right siderail bracket configured for engagement with the right wing segment of the right support board.

2. The reconfigurable patient transport system of claim 1, wherein the patient transport apparatus further comprises a left siderail coupled to the left side of the intermediate frame and a right siderail coupled to the right side of the intermediate frame, and wherein the left siderail bracket is coupled to the left siderail and the right siderail bracket is coupled to the right siderail.

3. The reconfigurable patient transport system of claim 2, wherein the hinge member comprises a left arm and a right arm pivotably coupled to one another and pivotable about a hinge axis.

4. The reconfigurable patient transport system of claim 3, wherein the left wing segment comprises a connection portion having an engagement profile, and wherein the left distal segment defines a connection slot having a complementary engagement profile and configured to receive the connection portion of the left wing segment.

5. The reconfigurable patient transport system of claim 4, wherein the connection slot of the left distal segment receives the connection portion of the left wing segment in a direction parallel to the hinge axis to facilitate removably coupling the left wing segment to the left distal segment.

6. The reconfigurable patient transport system of claim 4, wherein the left siderail bracket and the right siderail bracket each comprises a connection portion having a siderail profile, wherein the siderail profile is configured for complementary engagement with the engagement profile of the left wing segment and an engagement profile of the right wing segment.

7. The reconfigurable patient transport system of claim 1, wherein the patient transport apparatus further comprises a second left siderail bracket and a second right siderail bracket, and wherein the second left siderail bracket and the second right siderail bracket are configured for engagement with the left proximal segment and the right proximal segment of the patient support apparatus.

8. A reconfigurable patient transport system comprising:
- a patient support apparatus comprising:
  - a hinge member pivotable about a hinge axis;
  - a left support board and a right support board each coupled to the hinge member and extending longitudinally along a longitudinal axis between a head end and a foot end;
  - a left wing segment removably coupled to the left support board; and
  - a right wing segment removably coupled to the right support board; and
- a patient transport apparatus comprising:
  - a support frame comprising wheels facilitating movement along a floor surface;
  - an intermediate frame coupled to the support frame and comprising the support deck configured to support a patient, with the intermediate frame extending longitudinally between a head end and a foot end, and laterally between a left side and a right side;
  - a left siderail comprising a connection portion having a siderail profile configured for engagement with the left wing segment; and
  - a right siderail comprising a connection portion having a siderail profile configured for engagement with the right wing segment.

9. The patient support apparatus of claim 8, wherein the left support board and the right support board are symmetrical about the longitudinal axis.

10. The reconfigurable patient transport system of claim 8, wherein the hinge member comprises a left arm and a right arm pivotably coupled to one another and pivotable about a hinge axis.

11. The patient support apparatus of claim 8, wherein the left wing segment comprises a connection portion having an engagement profile, and wherein the left support board defines a connection slot having a complementary engagement profile and configured to receive the connection portion of the left wing segment.

12. The patient support apparatus of claim 11, wherein the connection slot of the left support board receives the connection portion of the left wing segment in a direction parallel to the hinge axis to facilitate removably coupling the left wing segment to the left support board.

13. The patient support apparatus of claim 11, wherein the engagement profile constrains movement in two directions when the connection portion of the left wing segment is received in the connection slot of the left support board.

14. The patient support apparatus of claim 11, wherein the right wing segment comprises a connection portion having an engagement profile, and wherein the right support board defines a connection slot having a complementary engagement profile and configured to receive the connection portion of the right wing segment.

15. A patient support apparatus extending longitudinally along a longitudinal axis between a head end and a foot end, the patient support apparatus comprising:
- a hinge member comprising a left arm and a right arm pivotably coupled to one another and pivotable about a hinge axis;
- a left support board coupled to the left arm of the hinge member and comprising:
  - a left proximal segment;
  - a left distal segment removably coupled to the left proximal segment; and
  - a left wing segment removably coupled to the left distal segment; and
- a right support board coupled to the right arm of the hinge member and comprising:
  - a right proximal segment;
  - a right distal segment removably coupled to the right proximal segment; and
  - a right wing segment removably coupled to the right distal segment.

16. The patient support apparatus of claim 15, wherein the left support board and the right support board are symmetrical about the longitudinal axis.

17. The patient support apparatus of claim 15, wherein the left wing segment comprises a connection portion having an engagement profile, and wherein the left distal segment defines a connection slot having a complementary engagement profile and configured to receive the connection portion of the left wing segment.

18. The patient support apparatus of claim 17, wherein the connection slot of the left distal segment receives the connection portion of the left wing segment in a direction parallel to the hinge axis to facilitate removably coupling the left wing segment to the left distal segment.

19. The patient support apparatus of claim 17, wherein the engagement profile constrains movement in two directions when the connection portion of the left wing segment is received in the connection slot of the left distal segment.

20. The patient support apparatus of claim 15, wherein the right wing segment comprises a connection portion having an engagement profile, and wherein the right distal segment defines a connection slot having a complementary engagement profile and configured to receive the connection portion of the right wing segment.

* * * * *